Dec. 28, 1954        J. R. BIRCHER, JR        2,698,286
                DEHYDRATION OF HYDRAZINE SOLUTIONS
Filed May 31, 1949                              2 Sheets-Sheet 1
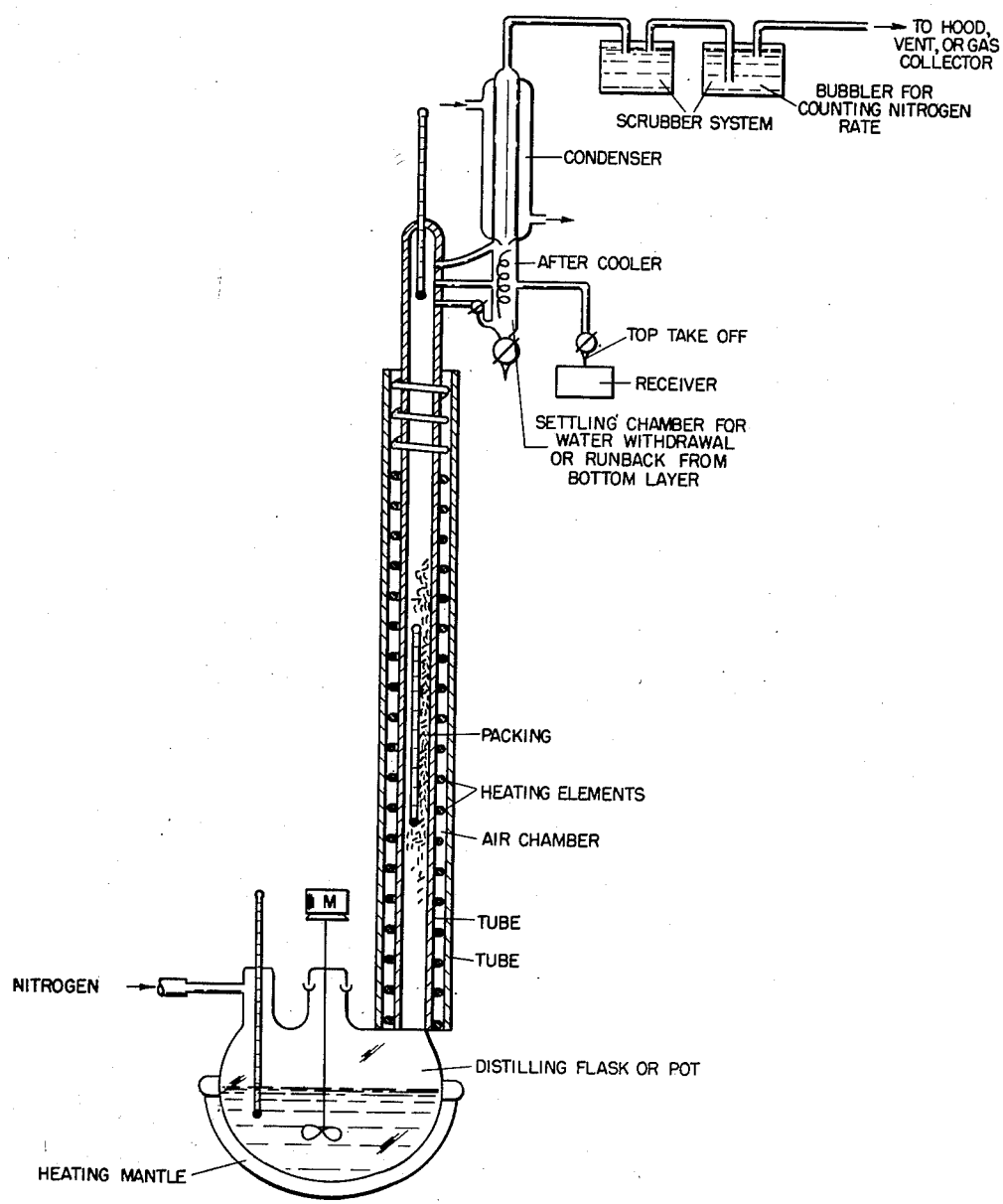
FIGURE I
INVENTOR.
John R. Bircher, Jr.
AGENTS

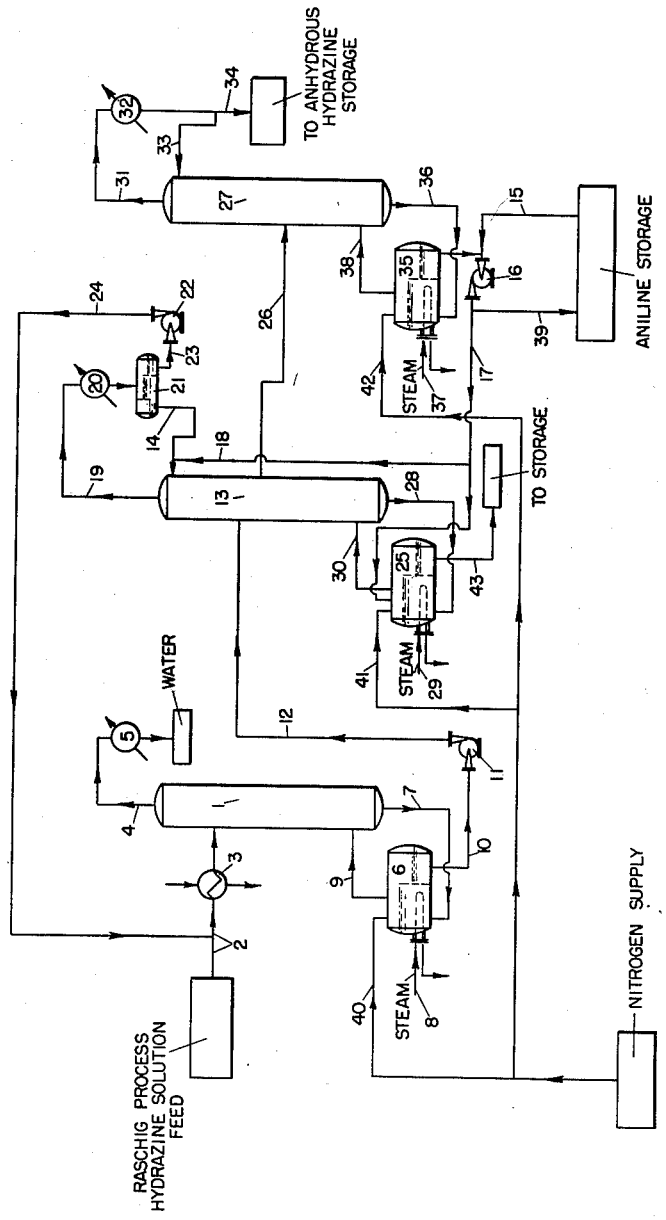

United States Patent Office 2,698,286
Patented Dec. 28, 1954

2,698,286

DEHYDRATION OF HYDRAZINE SOLUTIONS

John R. Bircher, Jr., Louisiana, Mo., assignor, by mesne assignments, to Battelle Development Corporation, Columbus, Ohio, a corporation of Delaware Application May 31, 1949, Serial No. 96,165

10 Claims. (Cl. 202—42)

This invention relates to a method or process for the dehydration of hydrazine-water mixtures or solutions and, in particular, for the production of anhydrous hydrazine. Specifically, this invention relates to a method or process for the production of 100 per cent hydrazine.

Hydrazine has many desirable uses particularly in organic synthesis, i. e., in the manufacture of phenyl-hydrazine. For the purposes of this invention hydrazine and water mixtures are also to be defined as hydrazine and water solutions.

Generally, in the production of hydrazine, a solution of hydrazine and water is first made, which is then treated by various methods to produce a material having from 95 to 98 per cent by weight of hydrazine. For example, the Raschig method is the only well-known, commercially-available method of making hydrazine, and the solution produced thereby initially contains about 3 per cent by weight of hydrazine. This solution is then treated with sulfuric acid to produce hydrazine sulfate ($N_2H_4 \cdot H_2SO_4$) which is a crystalline solid and thus easily filtered and dried. Some loss, however, occurs since the compound is soluble in water to some extent. The dried hydrazine sulfate is next reacted with liquid ammonia to form free hydrazine and ammonium sulfate. The hydrazine can be readily separated from the mixture, since it is a liquid at room temperatures while ammonium sulfate is a solid. Absolutely anhydrous hydrazine is not actually produced by this method as the best products contain only 94 to 95 per cent hydrazine, the balance being ammonia and water. Alternatively, the weak hydrazine solution can be partially dehydrated by simple distillation wherein part of the water is removed therefrom to provide a constant boiling (at 118.5° C.) mixture or azeotrope of about 70 per cent hydrazine and the balance water, i. e. 70.1 per cent hydrazine and 29.9 per cent water by weight. This azeotrope is often called hydrazine hydrate, and the water cannot be separated therefrom unless expensive procedures are followed like treatment with sulfuric acid as described above or with hygroscopic alkaline substances such as NaOH, BaO, KOH, etc. Treatment with these materials produces a commercially acceptable grade of hydrazine. In the employment of one method, e. g., treatment with NaOH, a quantity of solid NaOH is added to the hydrazine hydrate, and the whole is distilled. A small amount of a solution containing 95 per cent hydrazine, balance water, distills over first, followed by mixtures containing greater proportions of water. By repeating the treatment several times, it is possible to obtain a fair amount of material having from 95 to 98 per cent hydrazine and the balance water. It is readily seen that known methods of producing a hydrazine-rich material are inefficient and uneconomical in that they are wasteful of materials and time-consuming in the number of chemicals and steps employed and, further, produce neither 100 per cent hydrazine nor anhydrous hydrazine. Hence, it would be highly desirable to provide an efficient and economical method for breaking the hydrazine water azeotrope and for producing a material containing from 95 to 98 per cent hydrazine, and, preferably to produce anhydrous and 100 percent hydrazine.

It is, therefore, an object of this invention to provide an economical method or process for dehydrating hydrazine-water solutions or mixtures.

It is another object of this invention to provide an efficient method of producing a hydrazine material containing more than 95 per cent hydrazine.

It is still another object of this invention to provide a continuous method for the production of solutions containing more than 70 per cent hydrazine.

It is a further object of this invention to provide a method of producing anhydrous hydrazine.

It is a still further object of this invention to provide a method for the production of 100 per cent hydrazine.

These and other objects of the invention will become more apparent from the following detailed description, example and drawings in which, Figure 1 represents laboratory distillation apparatus adapted for use in the practice of the present invention, and Figure 2 is a diagrammatic flow sheet disclosing one industrial arrangement of apparatus for continuously producing anhydrous hydrazine.

It has now been found that hydrazine-water mixtures can be dehydrated by treating them with a third component or entrainer which forms an azeotrope with the water, boiling at a temperature different from the hydrazine and hydrazine-water azeotrope and thus serving to carry off the water. After part or all of the water has been removed, the hydrazine-rich solution is fractionally distilled to yield fractions containing from 70 per cent or more hydrazine and balance entrainer or water, up to 100 per cent hydrazine.

In general, the new and novel method disclosed herein contemplates the use of a hydrazine-water solution, produced by the Raschig or other process, as the raw material. This solution, containing from 3 to 60 per cent hydrazine and the balance water, is preferably then subjected to a simple distillation, resulting in an azeotropic bottoms product containing about 70 per cent hydrazine and about 30 per cent water. The entrainer is then added to this product and the resulting composition fractionally distilled. Although the entrainer can be added to the solution containing about 3 per cent or more hydrazine, it is much preferred for economical reasons to simply distill or fractionate the weak hydrazine solution. Other methods, i. e., chemical, can likewise be used to concentrate the hydrazine in the hydrazine-water solution, but they materially increase the processing costs. With the 70–30 hydrazine-water raw material containing the entrainer, the resulting forerun distillate usually consists of two phases: one, predominantly entrainer and containing some water and hydrazine and the second, predominantly water and containing entrainer and hydrazine. The hydrazine-rich entrainer solution remaining in the pot is subsequently stripped or refractionated to yield a hydrazine distillate with an entrainer-rich hydrazine solution or residue remaining. Continued distillation will yield fractions or distillates containing hydrazine and greater amounts of entrainer. The entrainer-hydrazine fractions can be refractionated to obtain more hydrazine or, if desirable, returned to the pot containing the entrainer-rich hydrazine bottoms. Nitrogen gas is continuously passed through the system during distillation.

The third component or entrainer which forms an azeotropic mixture with the water should boil at a temperature different from that of the hydrazine and hydrazine-water azeotrope, i. e., 113.5° C. and 118.5° C. respectively, so as to effect feasible separation by conventional distillation. Generally this difference should be at least 4 or 5° C. Additionally, the entrainer can form a ternary azeotrope containing water and more or less hydrazine. Lower efficiency will be obtained in this case, depending upon the hydrazine content of such a ternary azeotrope, for if substantial quantities of hydrazine (i. e., more than a few per cent) are present, only low yields will be obtained due to the fact that most of the hydrazine will be removed along with the water in the azeotrope leaving only small amounts of hydrazine behind for recovery in the subsequent refractionation step. Low yields, however, can be compensated for by greater ease in manipulation and subsequent separation. The entrainer can likewise form either a heterogeneous mixture (i. e., two or more phases) or a homogeneous solution with the hydrazine-water solution or hydrazine. Where the hydrazine and entrainer form two phases after removal of water, they can also be separated by decantation followed by distillation of the hydrazine fraction to free it of residual entrainer. In general, it is preferred that the entrainer be substantially insoluble in pure water, or easily separable therefrom by distillation or other means, so as to form a two-phase liquid system when the entrainer-water azeotrope is condensed at normal temperatures and pressures. The entrainer must not form a binary azeotrope with hydrazine.

Aniline, as an entrainer, has been found admirably suited for the purposes of this invention and is added to the concentrated 70 per cent hydrazine-30 per cent water solution in an amount of from about 8 to about 600 parts by weight of aniline to 100 parts by weight of the concentrated solution. Less than about 8 parts of aniline is insufficient to remove all the water from the hydrazine and materially increases the time of processing and number of recyclings of the mixture needed. The use of over 600 parts of aniline is wasteful and does not appear to increase materially the yields of anhydrous hydrazine. It has been found best to use from 300 to 500 parts by weight of aniline for batch operations, while 400 parts of aniline to 100 parts of the concentrated solution is to be preferred.

For continuous operations the aniline fed to the still is dependent on the feed rate of the hydrazine-water azeotrope and from 8 to 600 parts of aniline per 100 parts of hydrazine-water azeotrope represents the broad range while the use of 8 to 100 parts aniline is to be preferred.

In place of aniline, other entrainers can likewise be used to produce anhydrous hydrazine. Among these are benzene, pyridine, xylene, toluene, n-hexylamine, n-hexyl alcohol, phenol and xylidine. These entrainers can be added to the hydrazine solution in about the same ratio as described above with respect to the aniline. It is obvious, of course, from the description supra that less entrainer will remove less water.

In the practice of this invention, the entrainer, having the properties above described, is added to the hydrazine-water mixture, and heat is applied until distillation begins. The entrainer can also be added in its vapor form to the hydrazine-water mixture with the same results. This is similar to the technique employed in ordinary "steam distillation," except that the vapor of the entrainer, instead of water vapor, is used in this instance. In the usual case, wherein the entrainer-water azeotrope (or ternary azetrope) boils at a lower temperature than the hydrazine-water azeotrope, the first condensate consists of water and the entrainer, often containing some hydrazine. This is allowed to separate into two layers or, alternatively, is separated by distillation or chemical means, if a single-phase distillate is obtained. An entrainer-rich and a water-rich fraction is thus obtained. The entrainer-rich portion is returned to the still, or retained for future use; the water-rich portion can be discarded, or further treated to recover residual amounts of hydrazine or entrainer.

Generally, distillation is continued until water no longer appears in the distillate. With removal of all the water from the still charge, the residual charge or residue in the still now consists of hydrazine and the entrainer. This charge is separated by distillation into a hydrazine portion and an entrainer portion, the latter being returned to the process. An alternative procedure, however, is to add the entrainer in a quantity insufficient to form an azeotrope with all of the water present in the original mixture. Then, if during operation, none of the entrainer-rich portion of the distillate is returned to the still, the supply of entrainer will be exhausted before all the water is removed from the original charge. The material remaining in the still, in this case, will consist of hydrazine and water, containing more than 70.1 per cent hydrazine by weight. In this instance the material remaining in the still containing hydrazine and water, but more than 70.1 per cent hydrazine by weight, is separated by distillation into two fractions: hydrazine (boiling at 113.5° C.), and the hydrazine-water azeotrope (boiling at 118.5° C.). The latter portion is then recycled to the process.

A gas such as nitrogen is continuously passed through the apparatus to provide an inert atmosphere and thus reduce the danger of explosions. The flow of nitrogen should be controlled so that it does not create undue pressures to result in fracture of the equipment or appreciably change the rate of flow of the gases in the fractionating column. Nitrogen gas does not appear to detrimentally affect the aniline or hydrazine present and in some cases may even benefit the distillation process. In place of nitrogen other inert gases can also be used advantageously in this process. Among these are helium, neon, and argon.

Minor amounts of impurities are probably present in the hydrazine-water solutions, gases, charge, distillates and residues, although their presence and amount are not definitely known. However, while not absolutely necessary, it is naturally desirable that the materials used in the process disclosed herein should be substantially pure in order to decrease the amount of possible contaminants and to obtain reproducible results. In the case of the hydrazine-water solution, it is most desirable that impurities be at a minimum so that the solution contains essentially hydrazine and water.

It is preferred to operate the process disclosed herein at atmospheric pressure, although the process is operable over a pressure range of from 200 mm. to 5 atmospheres. While outside of these ranges anhydrous hydrazine can still be produced, no great improvement in results is obtained. Maintenance of very high or low pressures is, thus, inconvenient due to the necessity of employing expensive and large equipment, controls and safety devices.

The temperature range maintained for the charge in the pot in laboratory batch operations, Figure 1, is used to control the distillation rate of about 0.1 to 2 cc. per minute of the hydrazine-aniline fraction after removal of the aniline water azeotrope. Within a pot temperature range of from about 112 to about 118° C. a fraction distills containing from about 70 to about 90 per cent hydrazine and from about 30 to about 10 per cent aniline. It is preferred to maintain the temperature of the charge at from about 114 to about 116° C. in order to obtain at least 85 per cent hydrazine and the balance aniline. It is obvious that for a different arrangement and size of apparatus the correspondence between pot temperatures and distillation rate will be different.

When fractionating or stripping the 70–90 per cent hydrazine and 30–10 per cent aniline mixture to obtain 100 per cent hydrazine, it has been found best to use a pot temperature of from 112 to 114° C. although about 113° C. is preferred After the 100 per cent hydrazine fraction has distilled over, various cuts will be obtained in the range of from 114 to 116° C. containing greater amounts of aniline as the temperature increases. Up to 117° C. cuts containing from 96.5 to 99.5 per cent hydrazine are obtainable. As the temperature rises, the amount of hydrazine decreases in the hydrazine-aniline distillate.

The above temperatures are applicable for atmospheric pressures, and, obviously, the temperatures at which the various fractions distill will also vary somewhat as the pressure is increased or decreased.

The following example will serve to illustrate the invention with more particularity to those skilled in the art.

A solution containing 3 per cent by weight of hydrazine and the balance water, as produced by the Raschig method, was distilled using simple fractionating equipment to remove the excess water until an azeotropic constant boiling solution or mixture remained in the distilling flask containing about 70 per cent hydrazine and the balance water. The apparatus shown in Figure 1 was then assembled and 100 grams of this azeotropic mixture were then transferred to the three neck distilling flask or pot. 400 grams of aniline were added to make the distillation charge, nitrogen was passed through the system, and heat was applied. With the charge in the pot at a temperature of up to 112° C., 38 grams of forerun distillate was obtained in the settling chamber and consisted of two phases. The upper phase was predominantly water and contained some aniline and hydrazine while the lower phase consisted essentially of aniline with some water and hydrazine. The forerun distillate was then removed from the settling chamber and the distillation continued. With the charge at a temperature of 115° C., 18 grams of a single phase distillate were obtained containing about 85 per cent hydrazine and the balance aniline. When the temperature of the charge in the pot began to go above 116° C., the distillation was stopped and the apparatus cleaned out. The 85 per cent hydrazine-15 per cent aniline distillate was then charged to the pot, nitrogen was passed through the system, and distillation recommenced. With the charge at a temperature of 112–114° C., 5 grams of 100 per cent anhydrous hydrazine were produced. Additional fractions or cuts were taken at pot temperatures of 115° to 120° C. At a pot temperature of from 114° to 115° C., 3 grams of 99.5 per centh hydrazine, balance aniline, were obtained; from 115° to 117° C., 2 grams of 98.5 per cent hydrazine, balance aniline, were obtained; and from 117° to 119° C., 2 grams of 96.5 per cent hydrazine, balance aniline, were obtained. The fifth cut, taken at a pot temperature of from 119° to 121° C., contained 2 grams of 94.5 per cent hydrazine, balance aniline. Thus, from an original charge of 100 grams of azeotropic mixture (70 per cent hydrazine-30 per cent water), 5 grams of 100 per cent hydrazine were obtained or a total of 12 grams of an anhydrous solution containing 96.5 per cent hydrazine and the balance aniline. During all distillations the pressure maintained was atmospheric. Although head temperatures are generally preferred for controlling distillation, pot temperatures in almost all cases were used with the equipment to enable better control of the charge and prevent thermal decomposition of the hydrazine.

The above example shows that 100 per cent hydrazine is readily produced by treating the hydrazine-water mixture with aniline. If not needed, the cuts containing less than 100 per cent hydrazine can be returned to the aniline-water-hydrazine solution or to the aniline-hydrazine residue for further distillation.

Although the example above describes a batch separation procedure, continuous separation is also possible. For example, in Figure 2, a schematic flow sheet is shown of a continuous method of producing anhydrous hydrazine. The crude product from the Raschig process or other method containing 3 per cent or more hydrazine, and the balance water, is introduced into column 1 by means of pipe 2 and heated to the proper temperature by heat exchanger 3 before entering the column. Due to the temperature relationships existing in column 1, part of the water is vaporized and passes from the column through the vapor line 4 into the condenser 5 where it is condensed and removed from the system. The remainder of the hydrazine-water solution descends through the column and enters the reboiler 6 through line 7. Reboiler 6 is provided with a heat exchange surface suitable for use with steam which enters through line 8. The liquid in the reboiler is partially vaporized and returned to column 1 by means of the reboiler vapor line 9. When equilibrium in the column 1, reboiler 6 and incoming feed and departing vapor lines is established, a concentrated solution of hydrazine and water, containing approximately 70 per cent hydrazine and 30 per cent water, collects in reboiler 6. It is desirable to maintain a liquid level in the overflow section of the reboiler and this is accomplished by liquid level control instruments not shown but which are familiar to those experienced in the distillation and chemical industries. The concentrated hydrazine-water solution is withdrawn from reboiler 6 at a predetermined and appropriate rate by pipe 10 and the suction pump 11 and transferred through pipe 12 to the proper plate or tray in column 13. Column 13 is provided with a reflux line 14 through which an aniline-rich hydrazine solution or aniline containing little or no hydrazine is returned to column 13. In starting operation of this column, it is more expedient to pump aniline from storage through pipe 15, pump 16, and lines 17 and 18 rather than use reflux line 14. After operation has been started and equilibrium has been attained, the normal reflux through line 14 should be sufficient to maintain the desired operating conditions. As the descending aniline or aniline-rich hydrazine solution contacts the entering and ascending concentrated hydrazine-water solution in column 13 the water and aniline are vaporized together and pass from column 13 through the vapor line 19 into condenser 20 where condensation of the vapors takes place. The condensate, consisting of water, aniline and some hydrazine, then passes to separator 21 where the aqueous and oily phases separate by virtue of their relative insolubility in each other and their differences in density. The oily phase, consisting of aniline, hydrazine and some water is returned to the column as reflux through line 14 previously referred to, and the aqueous phase consisting of water containing some hydrazine and aniline is recycled back to column 1 through pump 22 and lines 23, 24 and 2. Due to the thermal relationships existing in column 13 which are maintained by means of reboiler 25, the descending liquids become richer in aniline and at some point below the feed plate determined by the characteristics and operation of the column a side stream having a composition of 75 to 85 per cent hydrazine and the balance aniline is removed by means of line 26 and introduced into column 27, the function of which will be described later. The liquid entering reboiler 25 by means of line 28 is maintained in a boiling state by means of the heat transfer surface contained in the reboiler to which steam enters through line 29. Vapor line 30 returns the vapors to column 13. The composition of the liquid in the reboiler is largely aniline, but can contain appreciable quantities of hydrazine if the proper temperature relationships are not maintained. In column 27 the separation of aniline and hydrazine is effected. The vaporized hydrazine passes from column 27 through line 31 to the condenser 32 where the anhydrous hydrazine is condensed. Part of the condensate is returned to the column as reflux through line 33, and the balance proceeds to storage through line 34. The liquid entering reboiler 35 by way of line 36 is essentially aniline, and it is vaporized in reboiler 35 by steam entering through line 37 and passing through the heat transfer unit contained in the reboiler. Line 38 then passes the aniline vapors to column 27. The pump 16 removes excess aniline from the reboiler 35 and transfers it through line 17 to reboiler 25 if necessary, or supplies additional quantities of reflux to column 13 through lines 17 and 18 as required. Any excess over these quantities is sent to storage through line 39. The heat exchanger 3, and reboilers 6, 25, and 35 are supplied with steam from an appropriate source through the lines indicated. Likewise, condensers 5, 20 and 32 are supplied with cooling water on other cooling media from any convenient source. The condensers 5, 20 and 32, and the separator 21 are provided with the usual vents, which are for the purpose of removing noncondensables from the system. The distillation process is conducted in a nitrogen atmosphere and gaseous nitrogen flowing from a supply tank or other source through a nitrogen header is conducted into reboilers 6, 25 and 35 by means of lines 40, 41 and 42 respectively. When necessary to shut down, the contents of reboiler 25 are sent to a storage tank by means of line 43. Valves, controls and other devices necessary for the satisfactory operation of the unit are not disclosed but are readily apparent to one skilled in the art and the practice of distillation. It is readily seen that by the use of the arrangement of equipment shown in Figure 2, it is possible to continuously supply a hydrazine-water solution to one end of the system while removing an anhydrous hydrazine distillate from the other end. There is thus provided a continuous method for the production of anhydrous hydrazine.

While the reasons for obtaining the novel results of this invention are not precisely known, it is believed that the entrainer successfully overcomes the water-holding power of the hydrazine, or that the entrainer replaces the water in the hydrazine-water azeotrope, and permits its removal therefrom. By subsequent fractional distillation, 100 per cent hydrazine is separated from the entrainer. Where it is not essential that 100 per cent hydrazine be produced, the process disclosed herein can be utilized to provide solutions containing 70 per cent or more hydrazine.

While Example 1 shows the use of a batch system, it should be theoretically possible with the equilibrium characteristics of the system to employ only one column or step, when starting with the hydrazine-water azeotrope. In such a column, it is possible to separate by fractions first, all of the aniline-water azeotrope; secondly, all of the 100 per cent anhydrous hydrazine; next, all of the aniline. For example, in starting with 100 parts of 70 per cent-hydrazine-30 per cent-water azeotrope, it should only be necessary to add, say 8 or possibly 15 parts of aniline to cause the desired separation. The forerun cut before separating into two phases in about 4 parts water to about 1 part of aniline, so about 8 parts of aniline should theoretically remove 30 parts of water when distilling. The charge then remaining in the pot will consist of hydrazine and aniline, so that the next cut is essentially 70 parts of pure hydrazine. No hydrazine-aniline azeotrope forms, so the succeeding cut will be the residual aniline, about 7 parts.

The advantages in the use of the method disclosed herein for the dehydration of hydrazine-water solutions as contrasted to known dehydration methods, are that this method is readily adapted to continuous operations; it eliminates the necessity of handling untractable solid materials such as caustic soda or strong liquids such as sulfuric acid and ammonia; and it does not require the regeneration of reagents to materially increase the cost of production. The method disclosed herein is, thus, much cheaper, cleaner, and simpler than methods heretofore employed for the concentration of hydrazine solutions and, in addition, results in anhydrous and 100 per cent hydrazine.

As various possible embodiments could be made in the invention described herein, and since many different changes can be made in the embodiments set forth, it is to be understood that all material disclosed is to be interpreted as illustrative and not in a limiting sense.

What is claimed is:

1. The method of dehydrating hydrazine which comprises distilling an aqueous hydrazine mixture comprising by weight about 70 per cent hydrazine and about 30 per cent water in the presence of an entrainer capable of forming an azeotrope with water, to remove an azeotrope with water and to produce a solution having a substantially different ratio of water and hydrazine than the original mixture, and distilling said solution in the absence of an entrainer to remove anhydrous hydrazine overhead.

2. The method according to claim 1, wherein the entrainer is aniline.

3. The method according to claim 1, wherein the entrainer is benzene.

4. The method according to claim 1, wherein the entrainer is toluene.

5. The method according to claim 1, wherein the entrainer is xylene.

6. The method according to claim 1, wherein the entrainer is n-hexyl alcohol.

7. The method of dehydrating hydrazine which comprises distilling an aqueous hydrazine mixture comprising by weight about 70 per cent hydrazine and about 30 per cent water in the presence of an organic entrainer selected from the group consisting of aniline, pyridine, benzene, phenol, xylidine, xylene, toluene, n-hexyl alcohol, and n-hexylamine, to remove an azeotrope with water and to produce a solution having a substantially different ratio of water and hydrazine than the original mixture, and distilling said solution in the absence of an entrainer to remove anhydrous hydrazine overhead.

8. In the method of producing hydrazine, the steps of distilling a solution comprising hydrazine and water to obtain a constant boiling mixture comprising by weight about 70 per cent hydrazine and about 30 per cent water, adding an entrainer to said constant boiling mixture, said entrainer capable of forming an azeotrope with water, and distilling to remove an azeotrope with water and to produce a solution having a substantially different ratio of water and hydrazine than the original mixture, and distilling said solution in the absence of an entrainer to remove anhydrous hydrazine overhead.

9. In the method of continuously producing anhydrous hydrazine, the steps consisting of passing a dilute aqueous solution containing hydrazine to a still, distilling said solution at a temperature of about 100° C. to remove water and obtain a 70 per cent hydrazine-30 per cent water azeotrope, withdrawing said azeotrope to a second still and adding an entrainer thereto in an amount of from 8 to 600 parts by weight of said entrainer to 100 parts by weight of said azeotrope, said entrainer capable of forming an azeotrope with water, distilling the resulting mixture to remove an azeotrope with water and produce a solution having a substantially different ratio of hydrazine and water than the original azeotrope, and distilling said solution in the absence of an entrainer to remove anhydrous hydrazine overhead.

10. In the method of dehydrating hydrazine solutions, the steps comprising distilling a solution consisting essentially of hydrazine and water to obtain an azeotropic mixture of about 70 per cent hydrazine and the balance water, adding from 8 to 600 parts by weight of aniline to 100 parts by weight of said mixture, and distilling to remove an azeotrope with water and to produce a solution having a substantially different ratio of water and hydrazine than the original mixture, and distilling said solution in the absence of an entrainer to remove anhydrous hydrazine overhead.

References Cited in the file of this patent

UNITED STATES PATENTS

| Number | Name | Date |
| --- | --- | --- |
| 910,858 | Raschig | Jan. 26, 1909 |
| 1,416,206 | Huff | May 16, 1922 |
| 1,833,717 | Laird | Nov. 24, 1931 |
| 1,989,541 | Blanchod | Jan. 29, 1935 |
| 2,290,636 | Deansley | July 21, 1942 |
| 2,465,959 | Tindall | Mar. 29, 1949 |
| 2,537,791 | Schwarcz | Jan. 9, 1951 |

OTHER REFERENCES

Partial Pressure Processes by Donald F. Othmer, Industrial and Engineering Chemistry for September 1941, page 1106.

Azeotropic Dehydration of Pyridine and its Homologs by Louis Berg et al., Industrial and Engineering Chemistry for June 1945, page 585.

The Chemistry of Hydrazine by L. F. Andrieth et al., Chemical and Engineering News for Dec. 13, 1948, page 3746.